(12) United States Patent
Xu (10) Patent No.: US 12,127,268 B2
(45) Date of Patent: Oct. 22, 2024

(54) RESOURCE CONFIGURATION METHOD, DEVICE, AND STORAGE MEDIUM

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 385 days.

(21) Appl. No.: 17/486,821

(22) Filed: Sep. 27, 2021

(65) Prior Publication Data
US 2022/0015156 A1 Jan. 13, 2022

Related U.S. Application Data

(63) Continuation of application No. PCT/CN2019/080665, filed on Mar. 29, 2019.

(51) Int. Cl.
*H04W 72/00* (2023.01)
*H04L 5/00* (2006.01)
(Continued)

(52) U.S. Cl.
CPC ....... *H04W 74/0841* (2013.01); *H04L 5/0051* (2013.01); *H04W 72/0446* (2013.01);
(Continued)

(58) Field of Classification Search
CPC ......... H04W 74/0841; H04W 72/0446; H04W 72/0453; H04W 72/1263; H04W 74/004; H04W 74/0866; H04W 72/20; H04W 72/1268; H04B 7/06; H04L 5/0023; H04L 5/0007; H04L 5/0044; H04L 5/0048; H04L 5/0053; H04L 5/1469
See application file for complete search history.

(56) References Cited

U.S. PATENT DOCUMENTS

| 2018/0255534 A1 | 9/2018 | Wang et al. |
| 2020/0260500 A1* | 8/2020 | Agiwal ............ H04W 28/0278 |

(Continued)

FOREIGN PATENT DOCUMENTS

| CN | 109495961 A | 3/2019 |
| CN | 111278156 A | 6/2020 |

(Continued)

OTHER PUBLICATIONS

OPPO (On Channel Structure for 2-step RACH, R-1902747, Mar. 2019).*

(Continued)

*Primary Examiner* — Lakeram Jangbahadur
(74) *Attorney, Agent, or Firm* — BAYES PLLC (57) ABSTRACT

Disclosed are a communication method, a terminal device and a network device. The method includes sending, by the terminal device, a preamble of a Message A (MsgA); and sending, by the terminal device according to a mapping rule between physical random access channel (PRACH) resources and physical uplink shared channel (PUSCH) resources, a PUSCH of the MsgA on a PUSCH resource corresponding to the preamble of the MsgA.

23 Claims, 5 Drawing Sheets

(51) Int. Cl.

| | | |
|---|---|---|
| *H04W 72/0446* | (2023.01) | |
| *H04W 72/0453* | (2023.01) | |
| *H04W 72/1263* | (2023.01) | |
| *H04W 74/00* | (2009.01) | |
| *H04W 74/08* | (2009.01) | |
| *H04W 74/0833* | (2024.01) | |

(52) U.S. Cl.
CPC ... *H04W 72/0453* (2013.01); *H04W 72/1263* (2013.01); *H04W 74/004* (2013.01); *H04W 74/0866* (2013.01)

(56) References Cited

U.S. PATENT DOCUMENTS

| | | | | |
|---|---|---|---|---|
| 2020/0314913 | A1* | 10/2020 | Rastegardoost | H04W 36/0077 |
| 2021/0360485 | A1* | 11/2021 | Tian | H04W 72/0446 |

FOREIGN PATENT DOCUMENTS

| | | |
|---|---|---|
| CN | 112399589 A | 2/2021 |
| JP | 7348301 B2 | 9/2023 |
| WO | 2018130740 A1 | 7/2018 |
| WO | 2019047766 A1 | 3/2019 |

OTHER PUBLICATIONS

ZTE (Summary of 7.2.1.1 Channel Structure for Two-step RACH, R-1903435, Mar. 1, 2019 (Mar. 2019)).*

Extended European Search Report issued in corresponding European Application No. 19922923.8, mailed Feb. 2, 2022, 6 pages.

First Office action issued in corresponding India Application No. 202127042557, mailed Mar. 22, 2022, 5 pages.

"On channel structure for 2-step RACH", Agenda Item: 7.2.1.1, Source: OPPO, 3GPP TSG RAN WG1 #96 R1-1902747, Athens, Greece, Feb. 25-Mar. 1, 2019, 5 pages.

First Office Action issued in corresponding Japanese Application No. 2021-557690, mailed Feb. 24, 2023.

Second Office Action issued in corresponding Chinese Application No. 202110949475.5, mailed Mar. 11, 2023.

Intel Corporation, "Channel structure for two-step RACH", R1-1902466, 3GPP TSG RAN WG1 #96 Athens, Greece, Feb. 25-Mar. 1, 2019.

NTT Docomo, Inc., "Remaining details on RACH procedure", R1-1720795, 3GPP TSG RAN WG1 Meeting #91 Reno, USA, Nov. 27-Dec. 1, 2017.

OPPO, "On Channel Structure for 2-step Rach", R1-1905051, 3GPP TSG RAN WG1 #96bis Xi'an, China, Apr. 8-12, 2019.

Request for CNIPA Patent Priority Review issued in corresponding Chinese Application No. 202110949475.5, mailed Aug. 26, 2022.

First Office Action issued in corresponding Chinese Application No. 202110949475.5, mailed Nov. 15, 2022.

International Search Report issued in corresponding International Application No. PCT/CN2019/080665, mailed Jan. 3, 2020, 40 pages.

PCT Written Opinion of the International Searching Authority issued in corresponding International Application No. PCT/CN2019/080665, mailed Jan. 3, 2020, 7 pages.

"Summary of 7.2.1.1 Channel Structure for Two-step RACH", Agenda Item: 7.2.1.1, Source: ZTE, 3GPP TSG RAN WG1 #96, R1-1903435, Athens, Greece, Feb. 25-Mar. 1, 2019, 27 pages.

"Summary of 7.2.1.2 Procedure for Two-step RACH", Agenda Item: 7.2.1.2, Source: ZTE, 3GPP TSG RAN WG1 #96, R1-1903436, Athens, Greece, Feb. 25-Mar. 1, 2019, 12 pages.

"Email discussion on potential link-level simulation assumption for 2-step RACH", Agenda Item: 7.2.1, Source: ZTE, 3GPP TSG RAN WG1 #96, R1-1903834, Athens, Greece, Feb. 25-Mar. 1, 2019, 19 pages.

Extended European Search Report issued in corresponding European Application No. 23198229.9, mailed Dec. 5, 2023.

First Office Action issued in corresponding Vietnamese Application No. 1-2021-06682, mailed Dec. 29, 2023.

Source: InterDigital Inc.; Title: Discussion on PRACH Resource Mapping for Beamforming 3GPP TSG-RAN WG2 NR AH#3 R2-1800515 Vancouver, Canada, Jan. 22-26, 2018.

Hearing Notice issued in corresponding Indian application No. 202127042557, mailed Jun. 10, 2024.

Notice of Allowance issued in corresponding Vietnamese application No. 1-2021-06682, mailed Jun. 25, 2024.

First Office Action issued in corresponding Korean application No. 10-2021-7031229, mailed Jul. 9, 2024.

Source: Huawei, HiSilicon; Title: Channel structure for 2-step RACH 3GPP TSG RAN WG1 Meeting #96 R1-1903056 Athens, Greece, Feb. 25-Mar. 1, 2019.

Source: NTT DOCOMO, INC.; Title: Discussion on Channel Structure for Two-Step Rach 3GPP TSG RAN WG1 #96 R1-1902784 Athens, Greece, Feb. 25-Mar. 1, 2019.

* cited by examiner

RESOURCE CONFIGURATION METHOD, DEVICE, AND STORAGE MEDIUM

CROSS-REFERENCE TO RELATED APPLICATION

This application is a continuation of International Application No. PCT/CN2019/080665, filed on Mar. 29, 2019, the entire contents of which are hereby incorporated by reference.

BACKGROUND

The present disclosure relates to the field of wireless communication technologies, and in particular to a resource configuration method and device and a storage medium.

In related technologies, Random Access Channel (RACH) includes a first type of random access channel and a second type of random access channel. For the first type of RACH, information interaction is required to be performed twice between a terminal device and a network device, that is, the terminal device sends a message (Msg) A to the network device, and the network device sends MsgB to the terminal device. Therefore, the first type of RACH is also called 2-step RACH. For the second type of RACH, the information interaction needs to be performed four times between the terminal device and the network device, and thus the second type of RACH is also called 4-step RACH.

In the first type of RACH, MsgA channel resource configuration includes configuration of a PRACH resource bearing a preamble and the configuration of a PUSCH resource bearing a payload. For PRACH resource configuration, the existing RACH occasion (RO) configuration method can be used.

SUMMARY

In order to solve the above technical problems, embodiments of the present disclosure provide a resource configuration method and device, and a storage medium. By configuring PUSCH resources, the transmission performance of the PUSCH is guaranteed and the capacity of the PUSCH is improved.

In a first aspect, an embodiment of the present disclosure provides a resource configuration method, including obtaining, by a terminal device, configuration information of Physical Uplink Shared Channel (PUSCH) resources.

In a second aspect, an embodiment of the present disclosure provides a resource configuration method, including determining, by a terminal device, a mapping rule between PUSCH resources and Physical Random Access Channel (PRACH) resources.

In a third aspect, an embodiment of the present disclosure provides a terminal device, and the terminal device includes a first processing unit configured to obtain configuration information of PUSCH resources.

In a fourth aspect, an embodiment of the present disclosure provides a terminal device, and the terminal device includes a second processing unit configured to determine a mapping rule between PUSCH resources and PRACH resources.

In a fifth aspect, an embodiment of the present disclosure provides a terminal device, including a processor and a memory configured to store a computer program that can run on the processor, wherein the processor is configured to run the computer program to perform the steps of the resource configuration method performed by the foregoing terminal device.

In a sixth aspect, an embodiment of the present disclosure provides a storage medium storing an executable program which, when being executed by a processor, implements the above resource configuration method performed by the terminal device.

DETAILED DESCRIPTION

In order to enable the features and technical content of the embodiments of the present disclosure to be understand in more detail, implementations of the embodiments of the present disclosure will be described in detail below with reference to the accompanying drawings. The drawings are for reference and explanation purposes only and are not to limit the embodiments of the present disclosure.

Before describing in detail the resource configuration method provided by the embodiments of the present disclosure, the second type of RACH is briefly described.

The terminal device establishes connection with the network device through RACH and obtains uplink synchronization. The main purpose of random access is to obtain uplink synchronization and assign a unique Cell Radio Network Temporary Identifier (C-RNTI) to the terminal device. The random access process is usually triggered by one of the following five events.

1. RRC Connection Re-establishment procedure: to enable the terminal device to re-establish the wireless connection after a radio link failure.

2. Handover: in this case, the terminal device needs to establish uplink synchronization with a new cell.

3. In a RRC_CONNECTED state, when the downlink data arrives (ACK/NACK needs to be replied at this time), the uplink is in a "out of synchronization" state.

4. In the RRC_CONNECTED state, when the uplink data arrives (for example, it is necessary to report a measurement report or to send user data), the uplink is in an "out of synchronization" state or there is no available PUCCH resource for SR transmission (at this time, the UE in the uplink synchronization state is allowed to use RACH instead of the role of SR).

5. In the RRC_CONNECTED state, in order to locate the terminal device, timing advance (TA) is required.

Figure 1:
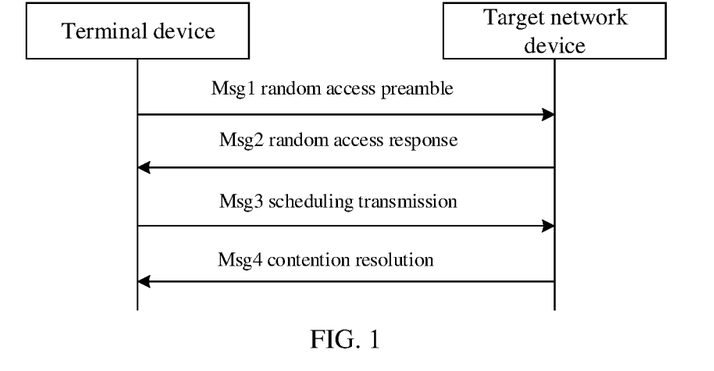
FIG. 1 is a schematic diagram of a processing flow of the second type of RACH according to the present disclosure.

The processing flow of the second type of random access, as shown in FIG. 1, includes the following four steps.

In step S101, the terminal device sends a random access preamble to the network device through a message 1 (Msg1).

The terminal device sends the selected preamble on the selected PRACH time-domain resource, and the network device can estimate uplink timing and a size of uplink grant required for the terminal device to transmit Msg3 based on the preamble.

In step S102, after detecting that a terminal device has sent a preamble, the network device sends a Random Access Response (RAR) message to the terminal device through Msg2 to inform the terminal device of uplink resource information that can be used in sending Msg3, assigns a radio network temporary identity (RNTI) to the terminal device, and provides a time advance command for the terminal device.

In step S103, after receiving the RAR message, the terminal device sends Msg3 in the uplink resource specified by the RAR message.

The message Msg3 is mainly used to notify the network device of what event triggered the RACH process. For example, if it is an initial random access event, Msg3 will carry the terminal device ID and establishment cause; and if it is an RRC re-establishment event, Msg3 will carry an identity of the terminal device in the connected state and the establishment cause. If it is in the RRC connected state, Msg3 includes a C-RNTI MAC CE.

At the same time, the ID carried in Msg3 can allow the contention conflict to be resolved in step S104.

In step S104, the network device sends Msg4 to the terminal device, Msg4 including a contention resolution message, and assigns uplink transmission resources to the terminal device at the same time.

When the terminal device receives Msg4 sent by the network device, it will detect whether the terminal device specific temporary identifier sent by the terminal device in Msg3 is included in the contention resolution message sent by the base station. If so, it indicates that the random access procedure of the terminal device is successful, otherwise it is considered that the random procedure fails, and the terminal device needs to initiate the random access procedure again from the first step.

Figure 2:
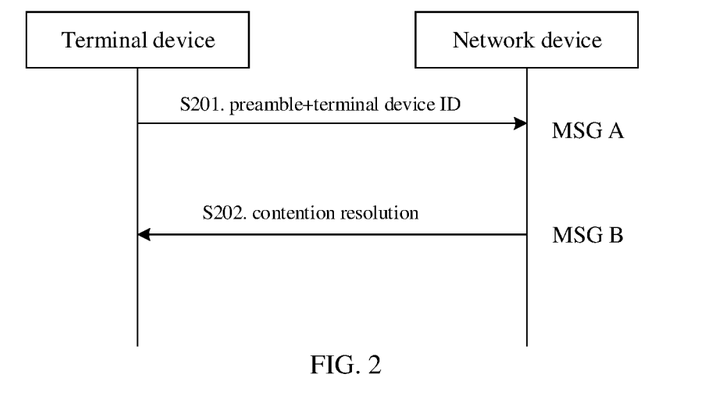
FIG. 2 is a schematic diagram of a processing flow of the first type of RACH according to the present disclosure.

The processing flow of the first type of random access, as shown in FIG. 2, includes the following two steps.

In step S201, the terminal device sends MsgA to the network device.

Here, MsgA is composed of the preamble and the payload. Optionally, the preamble is the same as the preamble in the second type of random access, and is transmitted on the PRACH resource, the information carried by the payload is the same as the information in the Msg3 in the second type of random access, for example, the RRC signaling in the RRC idle state, and C-RNTI MAC CE in the RRC connected state, and the payload can be transmitted by PUSCH. It can be understood that MsgA includes the contents of Msg1 and Msg3 in the second type of random access.

Figure 3:
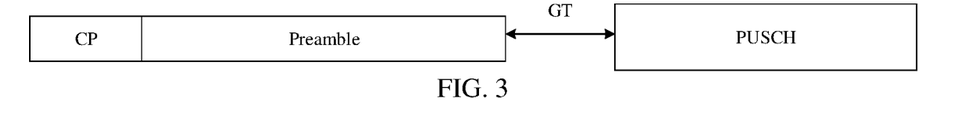
FIG. 3 is a schematic diagram of a channel structure of MsgA according to the present disclosure.

As shown in FIG. 3, a channel structure of MsgA includes the preamble and the PUSCH, where the time-domain resources of the preamble and a Cyclic Prefix (CP) thereof are in front of the PUSCH time-domain resources, with a Guard Time (GT) therebetween.

In step S202, the terminal device receives the MsgB sent by the network device.

Optionally, MsgB includes the contents of Msg2 and Msg4 in the second type of random access, and MsgB needs to be transmitted by the PDCCH and the PDSCH.

For the first type of random access, the channel structure of MsgA includes PDSCH resources and RO, where RO can provide up to 64 preambles, that is, it can support 64 users, and if the PUSCH resource for transmitting the payload in MsgA cannot support multi-user multiplexing of multiple PUSCH antenna ports on the same PUSCH resource, only the PUSCH transmission of one user (terminal device) can be supported on the same PUSCH resource, which not only limits the number of users supporting the first type of random access, but the system also needs to configure a large number of PUSCHs to support the transmission of MsgA in the first type of random access. Therefore, for the first type of random access, how to configure PUSCH resources is an urgent problem to be solved.

In view of the above problems, the present disclosure provides a resource configuration method, and the resource configuration method according to the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, a 5G system, among others.

Figure 4:
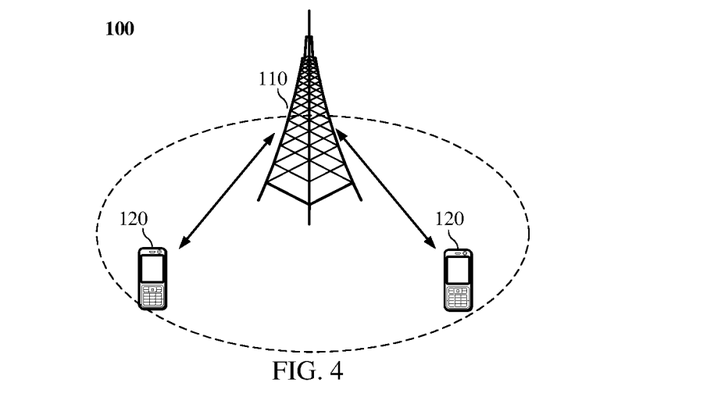
FIG. 4 is a schematic diagram of a composition structure of a communication system according to an embodiment of the present disclosure.

For example, a communication system to which an embodiment of the present disclosure is applied is as shown in FIG. 4. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, a base station (gNB) in a New Radio (NR)/5G system, or a wireless controller in a Cloud Radio Access Network (CRAN). Alternatively, the network device can be a mobile switching center, a relay station, an access point, an in-vehicle device, a wearable device, a hub, a switch, a bridge, a router, a network side device in a 5G network, a network device in a future evolutional Public Land Mobile Network (PLMN), or the like.

The communication system 100 also includes at least one terminal device 120 located within the coverage range of the network device 110. As used herein, the terminal device includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal device configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDA that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

Optionally, Device to Device (D2D) communication may be performed between the terminal devices 120.

Optionally, the 5G system or 5G network may also be referred to as a New Radio (NR) system or NR network.

FIG. 4 exemplarily shows one network device and two terminal devices. Optionally, the communication system 100 may include multiple network devices and other numbers of terminal devices can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system in the embodiments of the present disclosure may be referred to as the communication device. Taking the communication system 100 shown in FIG. 4 as an example, the communication device may include a network device 110 and terminal devices 120 which have the communication function. The network device 110 and the terminal devices 120 may be the specific devices as described above, which will not be repeated here. The communication device may also include other devices in the communication system 100, such as a network controller, a mobility management entity, and other network entities, which are not limited in the embodiments of the present disclosure.

Figure 5:
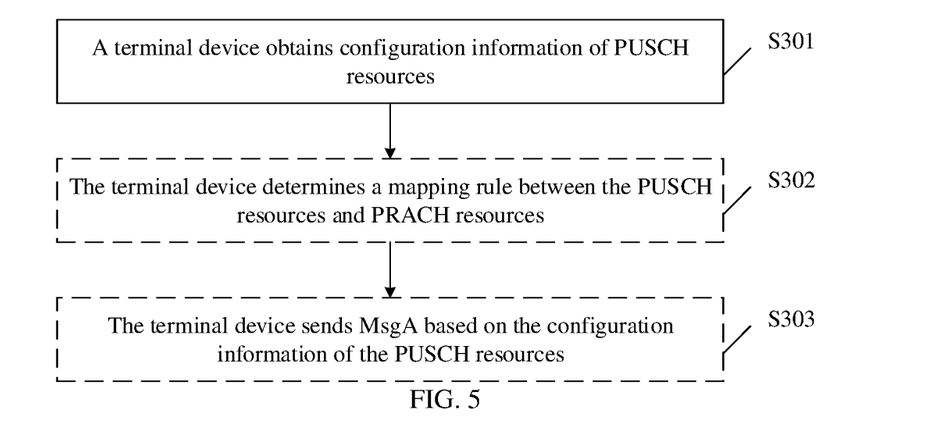
FIG. 5 is a schematic diagram of an optional processing flow of a channel resource configuration method according to an embodiment of the present disclosure.

As shown in FIG. 5, an optional processing flow of a channel resource configuration method according to an embodiment of the present disclosure includes the following steps.

In step S301, a terminal device obtains configuration information of PUSCH resources.

In an embodiment of the present disclosure, the PUSCH resources include at least one of the following: antenna ports supported by the PUSCH, PUSCH time-frequency resource blocks, and the antenna ports supported by the PUSCH as well as the PUSCH time-frequency resource blocks. Correspondingly, the configuration information of the PUSCH resources includes at least one of the following: the configuration information of the antenna ports supported by the PUSCH, the configuration information of the PUSCH time-frequency resource blocks, and the configuration information of the antenna ports supported by the PUSCH as well as the configuration information of the PUSCH time-frequency resource blocks.

First, the configuration information of the antenna ports supported by PUSCH will be described.

As an example, the configuration information of the antenna ports supported by the PUSCH includes at least one of the following: a number of antenna ports supported by the PUSCH, and the antenna ports supported by the PUSCH. The configuration information of the antenna ports supported by the PUSCH can be determined by the network device and notified to the terminal device through signaling, can be agreed in advance by the network device and the terminal device, or can be determined through a combination of the two.

When the configuration information of the antenna ports supported by the PUSCH includes the number of the antenna ports supported by the PUSCH, the number of antenna ports supported by the PUSCH represents a maximum number of antenna ports that can be supported on the same PUSCH resource. If the number is 2, it indicates that at most two antenna ports are supported on the PUSCH resource, and each antenna port supports the PUSCH transmission for one user. In this case, the number of antenna ports supported by the PUSCH is determined, and which antenna port can be specifically used can be determined according to pre-configured information or a preset strategy. For example, when the number of antenna ports supported by PUSCH is 2, it is determined according to the preset strategy that first two ports numbers of which are ranked top in an antenna port set are used, and when the antenna port set is {0, 2, 4, 8}, it indicates that the antenna ports supported by PUSCH are the first two antenna ports {0, 2} in the antenna port set. Determining which two ports are to be used according to the preset strategy refers to that it is agreed in advance which two antenna ports are used when the number of the antenna ports supported by PUSCH is two, and which four antenna ports are used when the number of the antenna ports supported by PUSCH is four. The antenna port set can be determined by the network device and notified to the terminal device by the network device through signaling in advance, or can be agreed in advance by the network device and the terminal device.

When the configuration information of the antenna ports supported by the PUSCH includes the antenna ports supported by the PUSCH, the configuration information of the antenna ports supported by the PUSCH directly indicates the antenna ports available on the same PUSCH resource. For example, when the configuration information of the antenna ports supported by the PUSCH indicates {0,1}, it represents that antenna ports 0 and 1 are available; when the configuration information of the antenna ports supported by PUSCH indicates {1, 3, 5, 7}, it represents that antenna ports 1, 3, 5 and 7 can be used on the PUSCH resource.

When the configuration information of the antenna ports supported by the PUSCH includes the number of antenna ports supported by the PUSCH and the antenna ports supported by the PUSCH, it directly indicates the number of the antenna ports supported by the PUSCH, and also directly indicates the antenna ports available on the same PUSCH resource.

As another example, in addition to at least one of the number of antenna ports supported by the PUSCH and the antenna ports supported by the PUSCH, the configuration information of the antenna ports supported by the PUSCH includes a MIMO layer for PUSCH transmission. The MIMO layer for the PUSCH transmission indicates the MIMO layer used for transmitting the PUSCH. For example, if the configuration information of the antenna ports supported by the PUSCH indicates 1 MIMO layer, it means that the PUSCH adopts single-layer data transmission; and if it indicates 2 MIMO layers, it means that the PUSCH adopts dual-layer data MIMO transmission. Optionally, the MIMO layer for the PUSCH transmission can be agreed by a protocol in advance, for example, it is agreed that the number of the MIMO layer is 1.

Further, in combination with the number of the antenna ports supported by the PUSCH and/or the number of the antenna ports supported by the PUSCH included in the configuration information of the antenna ports supported by the PUSCH, the terminal device can determine which antenna ports the terminal device selects for MIMO transmission. For example, the configuration information of the antenna ports supported by the PUSCH indicates that the antenna ports are {1, 3, 5, 7} and indicates two MIMO layers, then an antenna port pair selected by the terminal for dual-layer MIMO transmission is {1, 3}, or {5, 7}, or {1, 5}, or {3, 7}.

As another example, in addition to at least one of the number of the antenna ports supported by the PUSCH and the antenna ports supported by the PUSCH, the configuration information of the antenna ports supported by the PUSCH include a scrambling code ID of a DMRS of the PUSCH, that is, a value of $N_{ID}^0$ is 0, or a value of $N_{ID}^1$ is 1. The specific DMRS sequence of the PUSCH can be determined based on the scrambling code ID.

In an embodiment of the present disclosure, multiple PUSCH DMRS ports are multiplexed on the PUSCH resource, and the multiple PUSCH antenna ports are respectively used for the PUSCH transmission of MsgA of different users, which can increase the PUSCH transmission capacity of MsgA. Further, by configuring the number of antenna ports and the corresponding antenna ports, the network device can select an appropriate number of antenna ports based on load conditions and environment conditions of the channels deployed in the cell, which is beneficial to optimize the performance of the PUSCH transmission.

Next, the configuration information of the PUSCH time-frequency resource blocks will be described.

The configuration information of the PUSCH time-frequency resource blocks includes the configuration information of the PUSCH time-frequency resource blocks of resource assignment type 0 and the configuration information of the PUSCH time-frequency resource blocks of resource assignment type 1.

Regarding the configuration information of the PUSCH time-frequency resource blocks of resource assignment type 1, the PUSCH time-frequency resource blocks are composed of temporally continuous symbols and frequency-domain continuous Physical Resource Blocks (PRBs). The configuration information of the PUSCH time-frequency resource blocks of resource assignment type 1 includes at least one of the following: resource starting point of the PUSCH resource blocks, a number of frequency division multiplexed PUSCH resource blocks, a total number of PUSCH resources, a number of PRBs occupied by the PUSCH resource blocks, and a number of Orthogonal Frequency Division Multiplexing (OFDM) symbols occupied by the PUSCH resource blocks. The resource starting point of the PUSCH resource blocks includes a time starting point of the PUSCH resources and a frequency starting point of the PUSCH resources, such as a PRB or a starting symbol; and a number of frequency division multiplexed PUSCH resource blocks which indicates the number of the PUSCH resource blocks that can be frequency division multiplexed on a same temporal position (such as same one or more symbols, a same slot, etc.). In a specific implementation, the configuration information of the PUSCH time-frequency resource blocks of resource assignment type 1 can be all determined by the network device and then sent to the terminal device through signaling, or all can be agreed in advance by the network device and the terminal device by a protocol, or part of the configuration information of the PUSCH time-frequency resource blocks of resource assignment type 1 is determined by the network device and sent to the terminal device through signaling, and the other part is agreed in advance by the network device and the terminal device by a protocol. As to which part of the configuration information is sent by the network device to the terminal device through the signaling or is agreed in advance by the network device and the terminal device by the protocol, it is not limited in the embodiments of the present disclosure.

In a specific implementation, the network device may also configure multiple PUSCH resource block sets of different sizes, and each PUSCH resource block set may be configured based on the above method.

Figure 6:
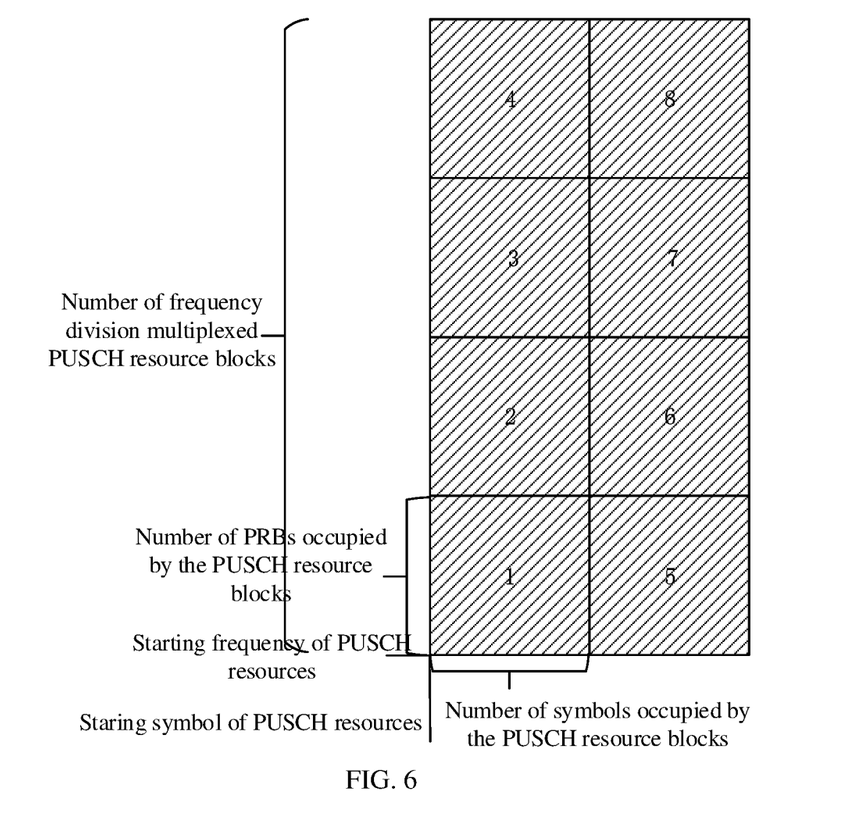
FIG. 6 is a schematic diagram of assignment of PUSCH resource blocks when assignment type 1 is adopted according to an embodiment of the present disclosure.

FIG. 6 is a schematic diagram of PUSCH resource block assignment when assignment type 1 is adopted, which illustrates the assignment of 8 PUSCH resource blocks, where the number of FDMed PUSCH resource blocks at the same temporal position is 4. It can be seen that positions of all the PUSCH resource blocks can be determined based on the starting time-frequency position of the PUSCH resources, the number of PRBs occupied by each PUSCH resource block, the number of symbols, the number of PUSCH resource blocks that are FDMed at the same temporal position, and so on.

Figure 7:
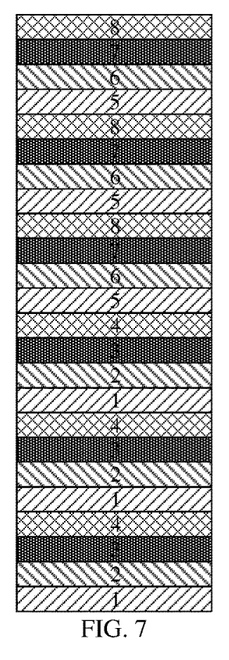
FIG. 7 is a schematic diagram of assignment of PUSCH resource blocks when assignment type 0 is adopted according to an embodiment of the present disclosure.

For the configuration information of the PUSCH time-frequency resource blocks of resource assignment type 0, the PUSCH time-frequency resource blocks are composed of temporally continuous symbols and PRBs that are not continuous in the frequency domain. The configuration information of the PUSCH time-frequency resource blocks of resource assignment type 0 includes at least one of the following: a resource starting point of the PUSCH resource blocks, a number of frequency division multiplexed PUSCH resource blocks, a total number of PUSCH resources, a number of OFDM symbols occupied by the PUSCH resource blocks, and resource assignment information of PRBs of the PUSCH resource blocks. The resource assignment information of the PRBs of the PUSCH resource blocks is indicated by any one of the following: a bitmap of the PRB or an RBG, and a distribution pattern of the PRB or RBG. In a specific implementation, the PRB (or RBG) distribution pattern indicates a multiplexing pattern of the PUSCH resources of multiple users. One way is to indicate the PRB/RBG distribution of each PUSCH resource block, and another way is to indicate a unified PRB/RBG distribution of the PUSCH resource blocks, and each PUSCH resource block adopts this distribution pattern. In a specific implementation, the configuration information of the PUSCH time-frequency resource blocks of resource assignment type 0 can be all determined and sent to the terminal device by the network device through signaling, or all can be agreed in advance by the network device and the terminal device through a protocol, or part of the configuration information of the PUSCH time-frequency resource blocks of resource assignment type 0 is determined by the network device and sent to the terminal device through signaling, and the other part is agreed in advance by the network device and the terminal device through the protocol. As to which configuration information is sent by the network device to the terminal device through signaling or which is agreed in advance by the network device and the terminal device through the protocol, it is not limited in the embodiments of the present disclosure.

FIG. 7 is a schematic diagram of assignment of the PUSCH resource blocks when the resource assignment type 0 is adopted, where the PRBs are evenly distributed on each PUSCH. Each PUSCH resource block is composed of 3 PRBs or RBGs, the PRBs or RBGs are uniformly distributed, and an interval between every two PRBs or RBGs is 3 PRBs or RBGs. On the same time resource, the PRBs or RBGs of multiple resource blocks are sequentially arranged in the frequency domain according to the resource distribution pattern. If the number of FDMed PUSCH resource blocks cannot be formed in one round of arrangement, they can be arranged again based on the resource distribution pattern. As shown in FIG. 7, the number of the FDMed PUSCH resource blocks is 8, but 4 PUSCH resource blocks (PUSCH resource blocks 1, 2, 3, 4) can be formed in one round of arrangement, and thus it needs a new round of resource arrangement starting from the 5th resource block so as to form the PUSCH resource blocks 5, 6, 7, and 8.

In an embodiment of the present disclosure, with the two PUSCH resource assignment methods, the configuration of PUSCH resources can be completed with a small number of parameters, thereby saving signaling overhead and further saving system broadcast overhead for configuring msgA resources.

In step S302, the terminal device obtains a mapping rule between the PUSCH resources and PRACH resources.

For the first type of random access, the PUSCH resource carrying msgA is formed by the PUSCH time-frequency resource blocks together with DMRS antenna ports of the PUSCH. The MsgA in the first type of random access includes two parts: the preamble and the PUSCH, and therefore, the terminal device needs to perform operations of selecting the PRACH resource and the PUSCH resource corresponding to the preamble before sending the msgA. The correspondence between PRACH resources and PUSCH resources may be one-to-one mapping, that is, one PRACH resource corresponds to one PUSCH resource, where one PRACH resource refers to a preamble on any PRACH occasion, and one PUSCH resource refers to the PUSCH transmission resource formed by the PUSCH time-frequency resource of one PUSCH resource block and one PUSCH DMRS port. The correspondence between the PRACH resources and the PUSCH resources may also be one-to-many mapping or many-to-one mapping, that is, one PRACH resource corresponds to multiple PUSCH resources or multiple PRACH resources correspond to one PUSCH resource. When multiple PRACH resources (RACH occasions) and multiple PUSCH resource blocks are configured, when determining the resource of MsgA, in addition to the mapping relationship between the PRACH resources and the PUSCH resources, the terminal device needs to know a mapping order of the PRACH resources and PUSCH resources. For example, when it is the one-to-one mapping relationship between any one of the above PRACH resources and any one of the above PUSCH resources, when the terminal device selects a certain preamble in a certain PRACH resource (RACH occasion), the terminal device needs to be able to determine the PUSCH resource corresponding to this preamble (that is, on which PUSCH resource block and which PUSCH DMRS port it is located).

On such basis, according to an embodiment of the present disclosure, the mapping rule between the PUSCH resources and the PRACH resources is determined in the following manner.

In some implementations, for the PRACH resource corresponding to the preamble, the mapping rule between the PUSCH resource and the PRACH resource includes that a dimension of the mapping between the PUSCH resource and the PRACH resource includes at least one of the following: preamble indices within a RACH occasion, PRACH resource numbers of frequency division multiplexed RACH occasions, time resource indices of time division multiplexed RACH occasions within a PRACH slot, and indices of PRACH slots. The RACH occasion refers to time domain resources and frequency domain resources for transmitting the preamble.

The mapping rule between the PUSCH resource and the PRACH resource includes that the PUSCH resource is mapped to the PRACH resource based on the following priority order:
1. An order of preamble indices within a RACH occasion; 2. An order of PRACH resource numbers of frequency division multiplexed RACH occasions; 3. An order of time resource indices of time division multiplexed RACH occasions within a PRACH slot; and 4. An order of indices of PRACH slots.

The mapping rule between the PUSCH resource and the PRACH resource includes that the PUSCH resource is mapped to the PRACH resource based on the following priority order: 1. An increasing order of the preamble indices within a RACH occasion; 2. An increasing order of the PRACH resource numbers of the frequency division multiplexed RACH occasions; 3. An increasing order of the time resource indices of the time division multiplexed RACH occasions within a PRACH time slot; and 4. An increasing order of the indices of the PRACH slots. It should be noted that the priority order in the above embodiment is the increasing order of each of the dimensions. In a specific implementation, the priority order may also be a decreasing order or in other forms.

For example, when the PUSCH resources are mapped to the PRACH resources based on the following priority order, the PRACH resources are mapped to the PUSCH resources first based on the order of the preamble indices within one RACH occasion, and after the mapping based on the preamble indices in the RACH occasion is completed, they are mapped to the PUSCH resources based on the order of the PRACH resource numbers of the frequency division multiplexed RACH occasions, and after the mapping based on the PRACH resource numbers of the frequency division multiplexed RACH occasions is completed, they are mapped to the PUSCH resources based on the order of the time resource indices of the time division multiplexed RACH occasions in one PRACH slot, and at last, they are mapped to the PUSCH resources based on the order of the indices of the PRACH slots.

It should be noted that the dimension of the preamble indices in the RACH occasion is represented by a sequence number (1), the dimension of the PRACH resource numbers of the frequency division multiplexed RACH occasions is represented by a sequence number (2), the dimension of the time resource indices of the time division multiplexed RACH occasions in one PRACH slot is represented by a sequence number (3), and the dimension of the indices of the PRACH slots is represented by a sequence number (4). The mapping priority of these 4 dimensions can be flexibly adjusted, for example, the priority is (1), (2), (3), and (4). In a different implementation, the priority can also be (2), (1), (3), (4), or (1), (2), (3), (4), or any combination thereof. In a specific implementation, the dimensions of the mapping between the PUSCH resources and the PRACH resources are the same as the dimensions included in the priority order of the mapping between the PUSCH resources and the PRACH resources. That is, whatever dimensions are included in the mapping between the PUSCH resources and the PRACH resources, the PUSCH resources are mapped to the PRACH resources based on the priority order of these dimensions. For example, the dimensions of the mapping between the PUSCH resources and the PRACH resource include the dimensions (1), (2) and (3) as mentioned above, and then the PUSCH resources are mapped to the PRACH resources based on the priority order of the dimensions (1), (2) and (3).

For the PUSCH resources, the mapping rule between the PUSCH resources and the PRACH resources includes that the dimensions of the mapping between the PRACH resources and the PUSCH resources include at least one of the following: PUSCH port indices in one PUSCH resource, PUSCH resource numbers of the frequency division multiplexed PUSCH resource block, and time resource indices of the time division multiplexed PUSCH resource blocks.

The mapping rule between the PRACH resources and the PUSCH resources includes that the PRACH resources are mapped to the PUSCH resources based on the following priority order: a. an order of PUSCH port indices in a PUSCH resource; b. an order of PUSCH resource numbers of frequency division multiplexed PUSCH resource blocks; and c. an order of time resource indices of time division multiplexed PUSCH resource blocks.

In an optional embodiment, the mapping rule between the PRACH resources and the PUSCH resources includes that the PRACH resources are mapped to the PUSCH resources based on the following priority order: a. an increasing order of PUSCH port indices in a PUSCH resource; b. an increasing order of PUSCH resource numbers of frequency division multiplexed PUSCH resource blocks; and c. an increasing order of time resource indices of time division multiplexed PUSCH resource blocks.

In an optional embodiment, the order of the PUSCH port indices in one PUSCH resource may be the increasing order of the PUSCH port indices in the PUSCH resource; the order of the PUSCH resource numbers may be the increasing order of the PUSCH resource numbers, and the order of the time resource indices may be the increasing order of the time resource indices. In the foregoing embodiments, the priority order is the increasing order of each of the dimensions. In a specific implementation, the priority order may also be the decreasing order, or other forms of the order.

For example, when the PRACH resources are mapped to the PUSCH resources based on the following priority order, the PUSCH resources are mapped to the PRACH resources first based on the order of the PUSCH port indices in one PUSCH resource, after the PUSCH port indices in one PUSCH resource have been used, the PUSCH resources are mapped to the PRACH resources based on the order of the PUSCH resource numbers of the frequency division multiplexed PUSCH resource blocks, and after the PUSCH resource numbers have been used, the PUSCH resources are mapped to the PRACH resources based on the order of the time resource indices of the time division multiplexed PUSCH resource blocks.

It should be noted that the dimension of the PUSCH port indices within one PUSCH resource is represented by sequence number a, the dimension of the PUSCH resource numbers of the frequency division multiplexed PUSCH resource blocks is represented by a sequence number b, and the dimension of the time resource indices of time division multiplexed PUSCH resource blocks is represented by a sequence number c. The mapping priority of these three dimensions can be flexibly adjusted, for example, the priority is a, b and c as mentioned above. In a different implementation, the priority can also be b, a, and c, or any combination of a, b and c. For example, for the frequency division multiplexed PUSCH resource blocks, firstly, they are mapping to the PRACH resources based on the order of the PUSCH resource numbers; then mapped to the PRACH resources based on the order of the PUSCH port indices in one PUSCH resource; and finally mapped to the PRACH resources based on the order of the time resource indices of the time division multiplexed PUSCH resource blocks. Alternatively, they are mapped to the PRACH resources first based on the order of the PUSCH resource numbers of the frequency division multiplexed PUSCH resource blocks; then mapped to the PRACH resources based on the order of the time resource indices of the time division multiplexed PUSCH resource blocks, and finally mapped to the PRACH resources based on order of the PUSCH port indices within one PUSCH resource. There are various orders of the mapping priority based on the three granularities of a, b, and c, which will not be illustrated one by one here. In a specific implementation, the dimensions of the mapping between the PRACH resources and the PUSCH resources are the same as the dimensions included in the priority order of the mapping between the PRACH resources and the PUSCH resources. That is, whatever dimensions are included in the mapping between the PRACH resources and the PUSCH resources, the PRACH resources are mapped to the PUSCH resources based on the priority order of these dimensions. For example, the dimensions of the mapping between the PUSCH resources and the PRACH resources include the dimensions (1), (2) and (3) as mentioned above, and then the PUSCH resources are mapped to the PRACH resources based on the priority order of the dimensions of (1), (2) and (3).

Figure 8:
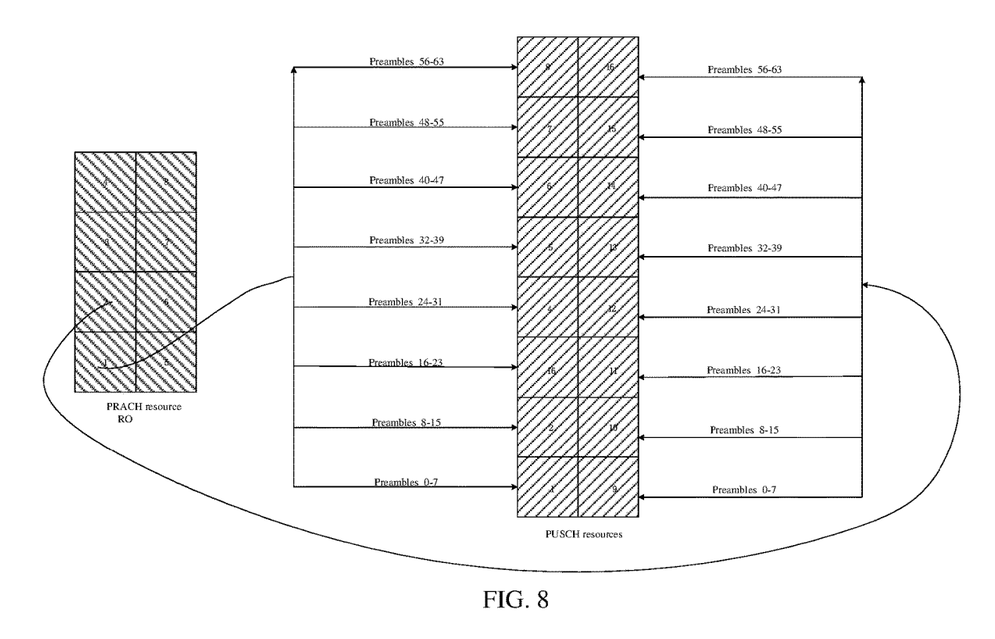
FIG. 8 is a schematic diagram of mapping between PRACH resources and PUSCH resources according to an embodiment of the present disclosure.

Description will be given by taking the mapping rule between the PRACH resources and the PUSCH resources as shown in FIG. 8 as an example. As shown in FIG. 8, 4 RO resources are FDMed, and 8 ROs are sequentially numbered as ROs 1-8 in the order in which the frequency is increased first and then the time is increased. Similarly, the PUSCH resources are numbered as 1-16 sequentially. One RO can provide 64 preambles, and it is assumed that one PUSCH resource block can support 8 PUSCH DMRSs, and the PRACH resources and PUSCH resources are mapped one-to-one. Then the preambles on the first RO can correspond to 8 PUSCH resource blocks, where preamble indices 0, 1, 2, 3 . . . 7 correspond to 8 PUSCH resources on a first PUSCH resource block (which correspond to 8 DMRS ports 0, 1, 2, 3 . . . 7, respectively), and preamble index 0 corresponds to the PUSCH resource of the PUSCH port index=0, preamble index 1 corresponds to the PUSCH resource of the PUSCH port index=1, preamble index 2 corresponds to the PUSCH resource of PUSCH port index=2, . . . , and preamble index 7 corresponds to the PUSCH resource of PUSCH port index=7. Similarly, preamble indices 8-15 correspond to 8 DMRS ports of a second PUSCH resource block with a number of 2, and so on.

Correspondingly, the RO resources with a number of 2 are respectively mapped to the DMRS ports on the PUSCH resource blocks with numbers of 9-16.

In an embodiment of the present disclosure, after determining the mapping relationship between the PRACH resources and the PUSCH resources and the respective mapping orders of the PRACH resources and the PUSCH resources, if the terminal device selects the PRACH resources, positions of corresponding PUSCH resources can be determined. For example, if the terminal device selects the PRACH resources, and determines that the mapping with the PUSCH resources is based on the order of the preamble indices in one RACH occasion and the order of the PRACH resource numbers of the frequency division multiplexed RACH occasions, the terminal device maps the PUSCH resources first based on the increasing order of the preamble indices in the RACH occasion and in the increasing order of the PUSCH port indices in one PUSCH resource. After the mapping based on the preamble indices in the RACH occasion is completed, the PUSCH resources are mapped in the increasing order of the PRACH resource numbers of the frequency division multiplexed RACH occasions. In mapping the PUSCH resources, when the mapping according to the PUSCH port indices in one PUSCH resource is completed, the mapping is then performed based on the increasing order of the PUSCH resource numbers of the frequency division multiplexed PUSCH resource blocks; and so on, until the mapping between the PRACH resources and the PUSCH resources is completed.

It should be noted that, in an embodiment of the present disclosure, the mapping rule between the PUSCH resources and the PRACH resources can be agreed in advance by the network device and the terminal device, or the network device determines the mapping rule between the PUSCH resources and the PRACH resources and informs the terminal device of the same through signaling.

It should be noted that there is no limitation on performing order of the step S301 and step S302. Step S301 can be performed first, and then step S302 can be performed; or step S302 can be performed first, and then step S301 can be performed; or step S301 and step S302 can be performed concurrently. In an embodiment of the present disclosure, only step S301 can be performed, or step S301 and step S302 can be performed.

In some optional embodiments, the method further includes, in step S303, the terminal device sends MsgA based on the configuration information of the PUSCH resources.

Figure 9:
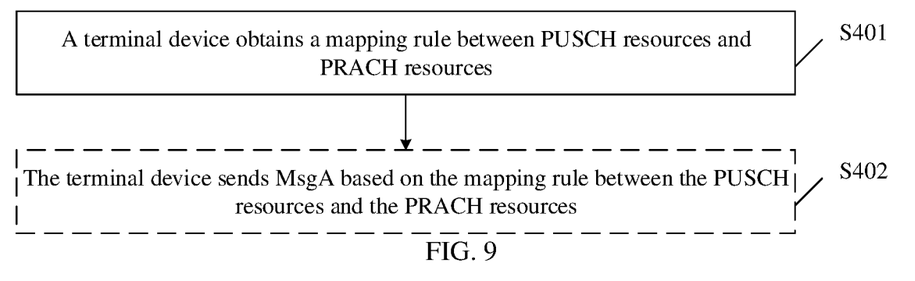
FIG. 9 is a schematic diagram of another optional processing flow of a channel resource configuration method according to an embodiment of the present disclosure.

As shown in FIG. 9, another optional process flow of a channel resource configuration method according to an embodiment of the present disclosure includes the following steps.

In step S401, a terminal device obtains a mapping rule between PUSCH resources and PRACH resources.

In an embodiment of the present disclosure, related description of the mapping rule between the PUSCH resources and the PRACH resources is the same as that of determining the mapping rule between the PUSCH resources and the PRACH resources by the terminal device in step S302, which will not be repeated here.

When the terminal device acquires the mapping rule between the PUSCH resources and the PRACH resources, the terminal device receives the mapping rule between the PUSCH resources and the PRACH resources sent by the network device.

Alternatively, the terminal device obtains the mapping rule between the PUSCH resources and the PRACH resources based on a preset mapping rule between the PUSCH resources and the PRACH resources, that is, the network device and the terminal device preset the mapping rule between the PUSCH resources and the PRACH resources.

Alternatively, the terminal device receives part of information of the mapping rule between the PUSCH resources and the PRACH resources sent by the network device, and obtains another part of the information of the mapping rule between the PUSCH resources and PRACH resources based on the preset mapping rule between the PUSCH resources and PRACH resources. The other part of the information of the mapping rule between the PUSCH resources and the PRACH resources is preset by the network device and the terminal device.

In some optional embodiments, the method further includes, in step S402, the terminal device sends MsgA based on the mapping rule between the PUSCH resources and the PRACH resources.

Figure 10:
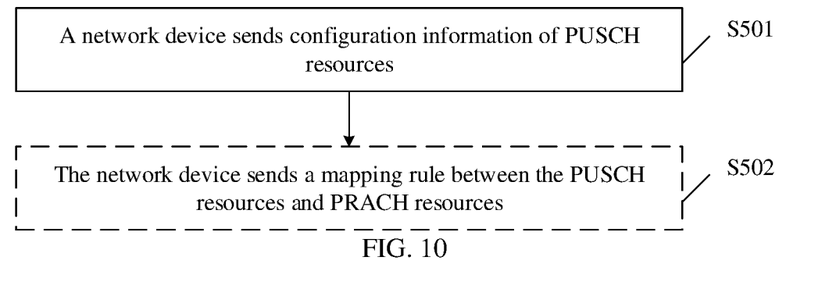
FIG. 10 is a schematic diagram of still another optional processing flow of a channel resource configuration method according to an embodiment of the present disclosure.

As shown in FIG. 10, another optional process flow of a channel resource configuration method according to an embodiment of the present disclosure includes the following steps.

In step S501, a network device sends configuration information of PUSCH resources.

Here, the network device sends the configuration information of the PUSCH resources to the terminal device; the configuration information of the PUSCH resources may be all configuration information of the PUSCH resources for transmitting MsgA, or part of the configuration information of the PUSCH resources for transmitting MsgA. When the configuration information of the PUSCH resources is the part of the configuration information of the PUSCH resources for transmitting MsgA, another part of the configuration information of the PUSCH resources for transmitting MsgA is preset by the network device and the terminal device; at this time, the terminal device has already known the other part of the configuration information, and it needs not to be sent to the terminal device again by the network device.

In an embodiment of the present disclosure, related description of the configuration information of the PUSCH resources is the same as that of determining the configuration information of the PUSCH resources by the terminal device in step S301, which will not be repeated here.

The method also includes in step S502, the network device sends a mapping rule between the PUSCH resources and PRACH resources.

In an embodiment of the present disclosure, all information of the mapping rule between the PUSCH resources and the PRACH resources may be determined by the network device and then sent to the terminal device; or part of the information of the mapping rule between the PUSCH resources and the PRACH resources is determined by the network device and then is sent to the terminal device, and at this time, another part of the information of the mapping rule between the PUSCH resources and the PRACH resources is preset by the network device and the terminal device, and at this time, the terminal device has already known the other part of the information, it needs not to be sent to the terminal device again by the network device.

In an embodiment of the present disclosure, related description of the mapping rule between the PUSCH resources and the PRACH resources is the same as that of determining the mapping rule between the PUSCH resources and the PRACH resources by the terminal device in step S302, which will not be repeated here.

In some optional embodiments, the method further includes receiving, by the network device, the MsgA sent based on the configuration information of the PUSCH resources.

The MsgA is sent from the terminal device to the network device. Optionally, the MsgA may also be sent by the terminal device based on the configuration information of the PUSCH resources and the mapping rule between the PUSCH resources and the PRACH resources.

Figure 11:
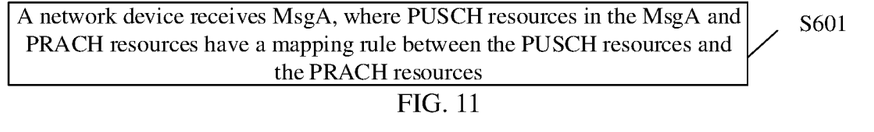
FIG. 11 is a schematic diagram of still another optional processing flow of a channel resource configuration method according to an embodiment of the present disclosure.

As shown in FIG. 11, still another optional process flow of a channel resource configuration method according to an embodiment of the present disclosure includes the following steps.

In step S601, a network device receives MsgA, where PUSCH resources in the MsgA and PRACH resources have a mapping rule between the PUSCH resources and the PRACH resources.

In an embodiment of the present disclosure, related description of the mapping rule between the PUSCH resources and the PRACH resources is the same as that of determining the mapping rule between the PUSCH resources and the PRACH resources by the terminal device in step S302, which will not be repeated here.

In some embodiments, before step S601 is performed, the method further includes, in step S600, the network device obtains the mapping rule between the PUSCH resources and the PRACH resources, and/or obtains the mapping rule between the PUSCH resources and the PRACH resources based on a preset mapping rule between the PUSCH resources and the PRACH resources.

It should be noted that the channel resource configuration method according to the embodiments of the present disclosure can be applied to the PUSCH channel carrying the MsgA in the first type of random access (2-step random access).

Figure 12:
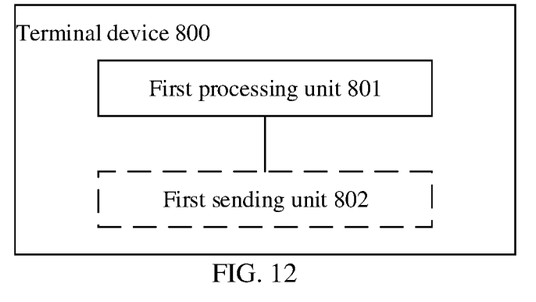
FIG. 12 is a schematic diagram of an optional composition structure of a terminal device according to an embodiment of the present disclosure.

In order to implement the foregoing channel resource configuration method, an embodiment of the present disclosure also provides a terminal device. An optional structure of the terminal device is shown in FIG. 12, and the terminal device 800 includes, a first processing unit 801 configured to obtain configuration information of PUSCH resources.

In an embodiment of the present disclosure, the first processing unit 801 is further configured to obtain a mapping rule between the PUSCH resources and physical PRACH resources.

In an embodiment of the present disclosure, the PUSCH resources include antenna ports supported by the PUSCH and/or PUSCH time-frequency resource blocks. Correspondingly, the configuration information of the PUSCH resources includes the configuration information of the antenna ports supported by the PUSCH and/or the configuration information of the PUSCH time-frequency resource blocks.

The configuration information of the antenna ports supported by the PUSCH includes at least one of the following: a number of antenna ports supported by the PUSCH; and the antenna ports supported by the PUSCH.

Alternatively, the configuration information of the antenna ports supported by the PUSCH includes the number of antenna ports supported by the PUSCH and/or the antenna ports supported by the PUSCH, and further includes a multiple-input multiple-output (MIMO) layer for PUSCH transmission.

Alternatively, the configuration information of the antenna ports supported by the PUSCH includes the number of antenna ports supported by the PUSCH and/or the antenna ports supported by the PUSCH, and further includes a scrambling code identifier ID of a PUSCH DMRS.

In an embodiment of the present disclosure, the configuration information of the PUSCH time-frequency resource blocks includes the configuration information of the PUSCH time-frequency resource blocks of resource assignment type 0 and the configuration information of the PUSCH time-frequency resource blocks of resource assignment type 1.

The configuration information of the PUSCH time-frequency resource block of resource assignment type 1 includes at least one of the following: a resource starting point of the PUSCH resource blocks, a number of frequency division multiplexed PUSCH resource blocks, a total number of PUSCH resources, a number of PRBs occupied by the PUSCH resource blocks and a number of OFDM symbols occupied by the PUSCH resource blocks.

The configuration information of the PUSCH time-frequency resource blocks of resource assignment type 0 includes at least one of the following: a resource starting point of the PUSCH resource blocks, a number of frequency division multiplexed PUSCH resource blocks, a total number of the PUSCH resources, a number of OFDM symbols occupied by the PUSCH resource blocks, and resource assignment information of PRBs of the PUSCH resource blocks. The resource assignment information of the PRBs of the PUSCH resource blocks is indicated by any one of the following methods: a bitmap of the PRB or RBG, and a distribution pattern of the PRB or the RBG. The resource starting point includes a time resource starting point and/or a frequency resource starting point.

In an embodiment of the present disclosure, the mapping rule between the PUSCH resources and the PRACH resources includes that a dimension of the mapping between the PUSCH resources and the PRACH resources includes at least one of the following: preamble indices in a RACH occasion, PRACH resource numbers of frequency division multiplexed RACH occasions, time resource indices of time division multiplexed RACH occasions within a PRACH slot, and indices of PRACH slots.

Correspondingly, the mapping rule between the PUSCH resources and the PRACH resources includes that the PUSCH resources are mapped to the PRACH resources based on the following priority order: an order of preamble indices in a RACH occasion; an order of PRACH resource numbers of frequency division multiplexed RACH occasions; an order of time resource indices of time division multiplexed RACH occasions within a PRACH slot; and an order of indices of PRACH slots.

Optionally, the mapping rule between the PUSCH resources and the PRACH resources includes that the PUSCH resources are mapped to the PRACH resources based on the following priority order: an increasing order of the preamble indices within one RACH occasion; an increasing order of the PRACH resource numbers of the frequency division multiplexed RACH occasions; an increasing order of the time resource indices of the time division multiplexed RACH occasions within one PRACH time slot; and an increasing order of the indices of the PRACH slots.

In an embodiment of the present disclosure, the mapping rule between the PUSCH resources and the PRACH resources includes that a dimension of the mapping between the PRACH resources and the PUSCH resources includes at least one of the following: PUSCH port indices in a PUSCH resource, PUSCH resource numbers of frequency division multiplexed PUSCH resource blocks, and time resource indices of time division multiplexed PUSCH resource blocks.

Correspondingly, the mapping rule between the PRACH resources and the PUSCH resources includes that the PRACH resources are mapped to the PUSCH resources based on the following priority order: an order of the PUSCH port indices in one PUSCH resource; an order of the PUSCH resource numbers of the frequency division multiplexed PUSCH resource blocks; and an order of the time resource indices of the time division multiplexed PUSCH resource blocks.

Optionally, the mapping rule between the PUSCH resources and the PRACH resources includes that the PUSCH resources are mapped to the PRACH resources based on the following priority order: an increasing order of the preamble indices within one RACH occasion; an increasing order of the PRACH resource numbers of the frequency division multiplexed RACH occasions; an increasing order of the time resource indices of the time division multiplexed RACH occasions within one PRACH time slot; and an increasing order of the indices of the PRACH slots.

In an embodiment of the present disclosure, the first processing unit 801 is configured to receive the configuration information of the PUSCH resources, and/or obtain the configuration information of the PUSCH based on preset configuration information of the PUSCH resources.

In some embodiments, the terminal device further includes a first sending unit 802 configured to send MsgA based on the configuration information of the PUSCH resources.

Figure 13:
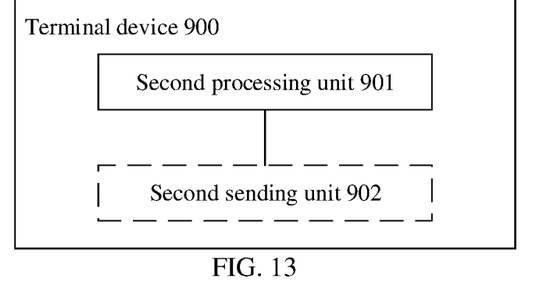
FIG. 13 is a schematic diagram of another optional composition structure of a terminal device according to an embodiment of the present disclosure.

In order to implement the foregoing channel resource configuration method, an embodiment of the present disclosure also provides a terminal device. Another optional structure of the terminal device is shown in FIG. 13, and the terminal device 900 includes, a second processing unit 901 configured to obtain a mapping rule between PUSCH resources and PRACH resources.

In an embodiment of the present disclosure, the relevant description of determining the mapping rule between the PUSCH resources and the PRACH resources by the second processing unit 901 is the same as that of determining the mapping rule between the PUSCH resources and the PRACH resources by the first processing unit 801 in the above-mentioned terminal device 800, which will not be repeated here.

The terminal device 900 further includes a second sending unit 902 configured to send MsgA based on the mapping rule between the PUSCH resources and the PRACH resources.

Figure 14:
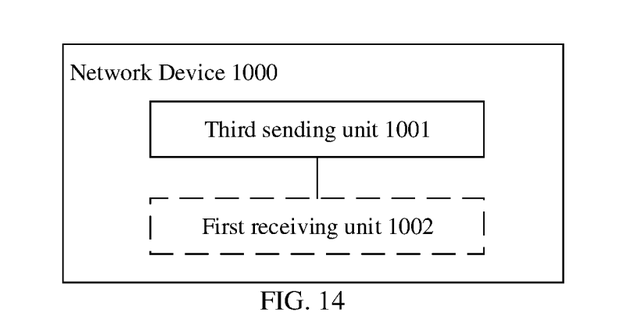
FIG. 14 is a schematic diagram of an optional composition structure of a network device according to an embodiment of the present disclosure.

In order to implement the foregoing channel resource configuration method, an embodiment of the present disclosure also provides another network device. An optional structure of the terminal device is shown in FIG. 14, and the network device 1000 includes a third sending unit 1001 configured to send configuration information of PUSCH resources.

In an embodiment of the present disclosure, the third sending unit 1001 is further configured to send a mapping rule between the PUSCH resources and PRACH resources.

In some embodiments, the network device 1000 further includes a first receiving unit 1002 configured to receive MsgA that is sent based on the configuration information of the PUSCH resources.

Figure 15:
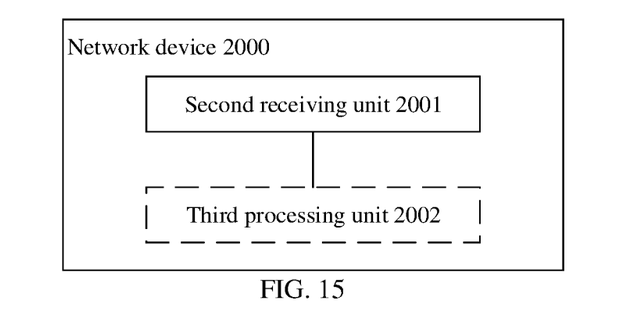
FIG. 15 is a schematic diagram of another optional composition structure of a network device according to an embodiment of the present disclosure.

In order to implement the foregoing channel resource configuration method, an embodiment of the present disclosure also provides another network device. A schematic diagram of a structure of the terminal device is as shown in FIG. 15, and the network device 2000 includes a second receiving unit 2001 configured to receive MsgA, where there is a mapping rule between physical uplink shared channel (PUSCH) resources in the MsgA and physical random access channel (PRACH) resources, the mapping rule being the one between the PUCCH resources and the PRACH resources.

In an embodiment of the present disclosure, the network device 2000 further includes a third processing unit 2002 configured to obtain the mapping rule between the PUSCH resources and the PRACH resources, and/or obtain the mapping rule between the PUSCH resources and the PRACH resources based on a preset mapping rule between the PUSCH resources and the PRACH resources.

It should be noted that, in an embodiment of the present disclosure, relevant description of obtaining the mapping rule between the PUSCH resources and the PRACH resources by the third processing unit 2002 is the same as that of obtaining the mapping rule between the PUSCH resources and the PRACH resources by the first processing unit 801 in the terminal device 800, which will not be repeated here.

An embodiment of the present disclosure also provides a terminal device, including a processor and a memory configured to store a computer program that can run on the processor, wherein the processor is configured to run the computer program to perform the steps of the resource configuration method performed by the foregoing terminal device.

An embodiment of the present disclosure also provides a network device, including a processor and a memory configured to store a computer program that can run on the processor, wherein the processor is configured to run the computer program to perform the steps of the resource configuration method performed by the foregoing network device.

Figure 16:
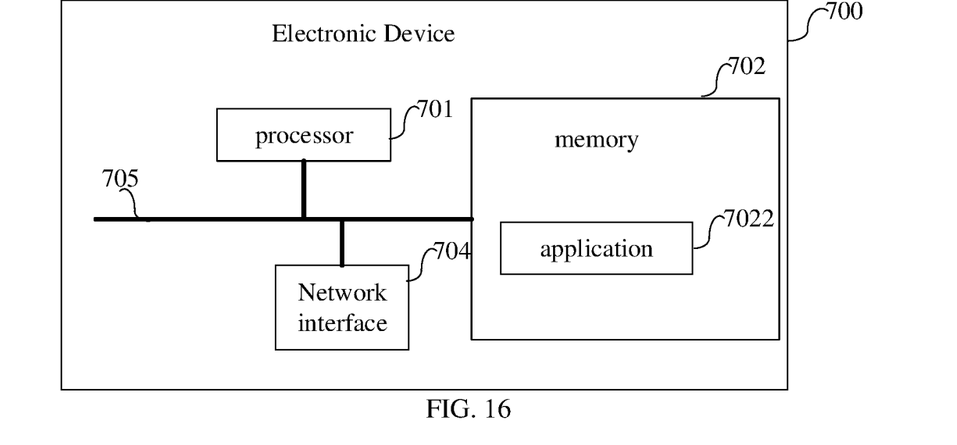
FIG. 16 is a structural schematic diagram of a hardware composition of an electronic device according to an embodiment of the present disclosure.

FIG. 16 is a schematic diagram of a hardware structure of an electronic device (a terminal device and a network device) according to an embodiment of the present disclosure. The terminal device 700 includes at least one processor 701, a memory 702, and at least one network interface 704. The various components in the terminal device 700 are coupled together through a bus system 705. It can be understood that the bus system 705 is used for connection and communication between these components. In addition to a data bus, the bus system 705 includes a power bus, a control bus, and a status signal bus. However, for clarity of description, various buses are marked as the bus system 705 in FIG. 16.

It can be understood that the memory 702 may be a volatile memory or a non-volatile memory, or may also include both the volatile and non-volatile memories. The non-volatile memory can be a ROM, a Programmable Read-Only Memory (PROM), an Erasable Programmable Read-Only Memory (EPROM), and an electrically erasable Programmable read-only memory (EEPROM), a ferromagnetic random access memory (FRAM), a flash memory, a magnetic surface memory, a optical disk, or a Compact Disc Read-Only Memory (CD-ROM). The magnetic surface memory can be a disk storage or a tape storage. The volatile memory may be a random access memory (RAM), which is used as an external cache. By way of exemplary but not restrictive description, various forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM)). The memory 702 described in the embodiments of the present disclosure is intended to include, but is not limited to, these and any other suitable types of memories.

The memory 702 in the embodiments of the present disclosure is used to store various types of data to support the operation of the terminal device 700. Examples of the data include any computer program used to operate on the terminal device 700, such as an application program 7022. The program for implementing the method of the embodiments of the present disclosure may be included in the application program 7022.

The methods disclosed in the foregoing embodiments of the present disclosure may be applied in the processor 701 or implemented by the processor 701. The processor 701 may be an integrated circuit chip with signal processing capabilities. In implementations, the steps of the foregoing methods can be carried out by hardware integrated logic circuits in the processor 701 or instructions in the form of software. The aforementioned processor 701 may be a general-purpose processor, a digital signal processor (DSP), or other programmable logic devices, discrete gates, transistor logic devices, discrete hardware components, and the like. The processor 701 may implement or perform various methods, steps, and logical block diagrams disclosed in the embodiments of the present disclosure. The general-purpose processor may be a microprocessor or any conventional processor. The steps of the methods disclosed in the embodiments of the present disclosure can be directly embodied as being performed and completed by a hardware decoding processor, or performed by a combination of hardware and software modules in the decoding processor. The software modules may be located in a storage medium, and the storage medium is located in the memory 702. The processor 701 reads information in the memory 702 and carries out the steps of the foregoing methods in combination with its hardware.

In an exemplary embodiment, the terminal device 700 may be implemented by one or more application specific integrated circuits (ASICs), DSPs, programmable logic devices (PLDs), complex programmable logic devices (CPLDs), FPGAs, general-purpose processors, controllers, MCUs, MPUs, or other electronic components to perform the aforementioned methods.

The embodiments of the present disclosure also provide a storage medium for storing a computer program.

Optionally, the storage medium can be applied to the terminal device in the embodiments of the present disclosure, and the computer program causes a computer to perform the corresponding process in the methods according to the embodiments of the present disclosure, which will not be repeated here for the sake of brevity.

The present disclosure is described with reference to the flowcharts and/or block diagrams of the methods, devices (systems), and computer program products according to the embodiments of the present disclosure. It should be understood that each process and/or block in the flowcharts and/or block diagrams, and combinations of processes and/or blocks in the flowcharts and/or block diagrams can be implemented by computer program instructions. These computer program instructions can be provided to the processor of a general-purpose computer, a special-purpose computer, an embedded processor, or processors of other programmable data processing devices to generate a machine, so that the instructions executed by the processor of the computer or other programmable data processing devices generate a device for implementing the functions specified in one or more processes in the flowcharts and/or one or more blocks in the block diagrams.

These computer program instructions can also be stored in a computer-readable memory that can direct a computer or other programmable data processing devices to operate in a specific manner, so that the instructions stored in the computer-readable memory produce an article of manufacture including an instruction device which implements the functions specified in one or more processes in the flowcharts and/or one or more blocks in the block diagrams.

These computer program instructions can also be loaded on a computer or other programmable data processing devices to cause a series of operation steps to be performed on the computer or other programmable devices to generate computer-implemented processes, so that the instructions executed on the computer or other programmable devices provide steps for implementing functions specified in one or more processes in the flowcharts and/or one or more blocks in the block diagrams.

Those described above are only some embodiments of the present disclosure and are not intended to limit the protection scope of the present disclosure. Any modification, equivalent replacement and improvement made within the spirit and principle of the present disclosure shall be included within the protection scope of the present disclosure.

What is claimed is:

1. A method for communication, comprising:
sending, by a terminal device, a preamble of a Message A (MsgA); and
sending, by the terminal device according to a mapping rule between physical random access channel (PRACH) resources and physical uplink shared channel (PUSCH) resources, a PUSCH of the MsgA on a PUSCH resource corresponding to the preamble of the MsgA,
wherein the mapping rule between the PRACH resources and the PUSCH resources comprises that the PRACH resources are mapped to the PUSCH resources in the following order:
first in an increasing order of preamble indices within each PRACH occasion;

secondly in an increasing order of PRACH resource numbers for frequency division multiplexed PRACH occasions; and then in an increasing order of time resource indices for time division multiplexed PRACH occasions within a PRACH slot.

2. The method according to claim 1, wherein one PUSCH resource comprises:
PUSCH time-frequency resources of one PUSCH resource block; and
one PUSCH DMRS port.

3. The method according to claim 1, wherein one PRACH resource comprises:
one preamble on one PRACH occasion.

4. The method according to claim 1, wherein the mapping rule between the PRACH resources and the PUSCH resources comprises that multiple PRACH resources are mapped to one PUSCH resource.

5. The method according to claim 1, wherein the mapping rule between the PRACH resources and the PUSCH resources comprises that the PUSCH resources are mapped to the PRACH resources in the following order:
first in an increasing order of PUSCH resource numbers for frequency division multiplexed PUSCH resource blocks;
secondly in an increasing order of PUSCH DMRS port indices; and
then in an increasing order of time resource indices of time division multiplexed PUSCH resource blocks.

6. The method according to claim 1, wherein the mapping rule between the PRACH resources and the PUSCH resources is a preset rule.

7. A method for communication, comprising:
receiving, by a network device, a preamble of a Message A (MsgA); and
receiving, by the network device, a physical uplink shared channel (PUSCH) of the MsgA on a PUSCH resource corresponding to the preamble of the MsgA, wherein correspondence between the preamble of the MsgA and the PUSCH resource follows a mapping rule between physical random access channel (PRACH) resources and PUSCH resources,
wherein the mapping rule between the PRACH resources and the PUSCH resources comprises that the PRACH resources are mapped to the PUSCH resources in the following order:
first in an increasing order of preamble indices within each PRACH occasion;
secondly in an increasing order of PRACH resource numbers for frequency division multiplexed PRACH occasions; and
then in an increasing order of time resource indices for time division multiplexed PRACH occasions within a PRACH slot.

8. The method according to claim 7, wherein one PUSCH resource comprises:
PUSCH time-frequency resources of one PUSCH resource block; and
one PUSCH DMRS port.

9. The method according to claim 7, wherein one PRACH resource comprises:
one preamble on one PRACH occasion.

10. The method according to claim 7, wherein the mapping rule between the PRACH resources and the PUSCH resources comprises that multiple PRACH resources are mapped to one PUSCH resource.

11. The method according to claim 7, wherein the mapping rule between the PRACH resources and the PUSCH resources comprises that the PUSCH resources are mapped to the PRACH resources in the following order:
(d) in an increasing order of PUSCH resource numbers for multiple PUSCH resource blocks on a same time resource;
(e) in an increasing order of PUSCH DMRS port indices; and
(f) in an increasing order of time resource indices for multiple time resources on a slot,
wherein a priority of the order in (d) is higher than a priority of the order in (e), and the priority of the order in (e) is higher than a priority of the order in (f).

12. The method according to claim 7, wherein the mapping rule between the PRACH resources and the PUSCH resources is a preset rule.

13. A terminal device, comprising:
a processor; and
a memory configured to store a computer program executable by the processor,
wherein the processor is configured to execute the computer program to cause the terminal device to perform steps of:
sending a preamble of a Message A (MsgA); and
sending, according to a mapping rule between physical random access channel (PRACH) resources and physical uplink shared channel (PUSCH) resources, a PUSCH of the MsgA on a PUSCH resource corresponding to the preamble of the MsgA,
wherein the mapping rule between the PRACH resources and the PUSCH resources comprises that the PRACH resources are mapped to the PUSCH resources in the following order:
first in an increasing order of preamble indices within each PRACH occasion;
secondly in an increasing order of PRACH resource numbers for frequency division multiplexed PRACH occasions; and
then in an increasing order of time resource indices for time division multiplexed PRACH occasions within a PRACH slot.

14. The terminal device according to claim 13, wherein one PUSCH resource comprises:
PUSCH time-frequency resources of one PUSCH resource block; and
one PUSCH DMRS port.

15. The terminal device according to claim 13, wherein one PRACH resource comprises:
one preamble on one PRACH occasion.

16. The terminal device according to claim 13, wherein the mapping rule between the PRACH resources and the PUSCH resources comprises that multiple PRACH resources are mapped to one PUSCH resource.

17. The terminal device according to claim 13, wherein the mapping rule between the PRACH resources and the PUSCH resources comprises:
for preambles in different time resources, mapping of the preamble in a time resource with a small time resource index is prioritized;
for preambles in different PRACH occasions and in a same time resource, mapping of the preamble in a PRACH occasion with a small PRACH occasion index is prioritized; and
for preambles in a same PRACH occasion and in a same time resource, mapping of the preamble with a small preamble index is prioritized.

18. The terminal device according to claim 13, wherein the mapping rule between the PRACH resources and the PUSCH resources comprises:
- for PUSCH resources in different time resources, mapping of the PUSCH resource in a time resource with a small time resource index is prioritized;
- for PUSCH resources with different PUSCH DMRS ports in a same time resource, mapping of the PUSCH resource with a small PUSCH DMRS port index is prioritized; and
- for PUSCH resources with a same PUSCH DMRS port index and different PUSCH resource numbers of PUSCH time resource blocks in a same time resource, mapping of the PUSCH resource with a small PUSCH resource number is prioritized.

19. A network device, comprising:
a processor; and
a memory configured to store a computer program executable by the processor,
wherein the processor is configured to execute the computer program to cause the network device to perform steps of:
receiving a preamble of a Message A (MsgA); and
receiving a physical uplink shared channel (PUSCH) of the MsgA on a PUSCH resource corresponding to the preamble of the MsgA, wherein correspondence between the preamble of the MsgA and PUSCH resource follows a mapping rule between physical random access channel (PRACH) resources and PUSCH resources,
wherein the mapping rule between the PRACH resources and the PUSCH resources comprises that the PRACH resources are mapped to the PUSCH resources in the following order:
- first in an increasing order of preamble indices within each PRACH occasion;
- secondly in an increasing order of PRACH resource numbers for frequency division multiplexed PRACH occasions; and
- then in an increasing order of time resource indices for time division multiplexed PRACH occasions within a PRACH slot.

20. The network device according to claim 19, wherein one PUSCH resource comprises:
PUSCH time-frequency resources of one PUSCH resource block; and
one PUSCH DMRS port.

21. The network device according to claim 19, wherein one PRACH resource comprises:
one preamble on one PRACH occasion.

22. The network device according to claim 19, wherein the mapping rule between the PRACH resources and the PUSCH resources comprises that multiple PRACH resources are mapped to one PUSCH resource.

23. The network device according to claim 19, wherein the mapping rule between the PRACH resources and the PUSCH resources comprises that the PUSCH resources are mapped to the PRACH resources in the following order:
- first in an increasing order of PUSCH resource numbers for frequency division multiplexed PUSCH resource blocks;
- secondly in an increasing order of PUSCH DMRS port indices; and
- then in an increasing order of time resource indices of time division multiplexed PUSCH resource blocks.

* * * * *